Feb. 28, 1939. F. L. WHITE 2,149,154
STEAM PISTON
Filed Dec. 3, 1937 2 Sheets-Sheet 1
Fig. 1.
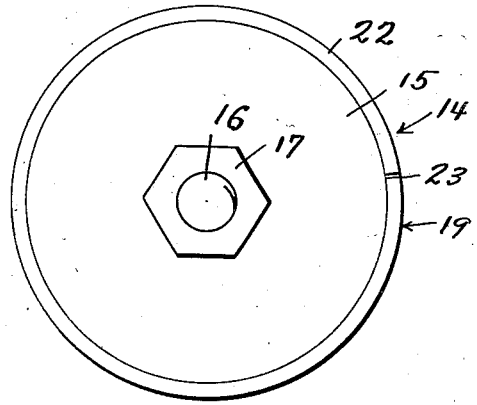
Fig. 2.
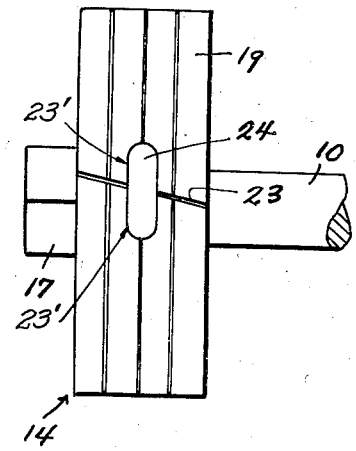
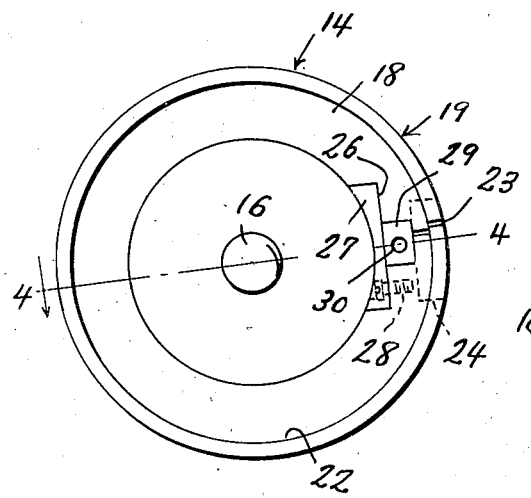
Fig. 3.
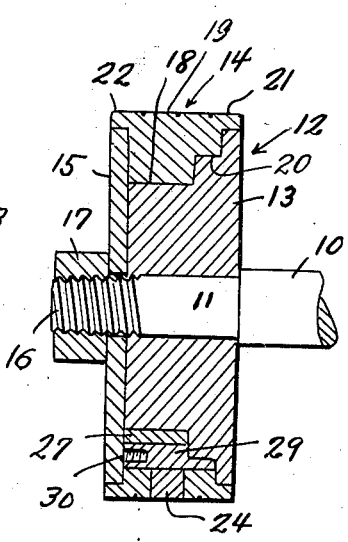
Fig. 4.
Inventor
Fitzhugh Lee White
By Clarence A. O'Brien
Hyman Berman
Attorneys

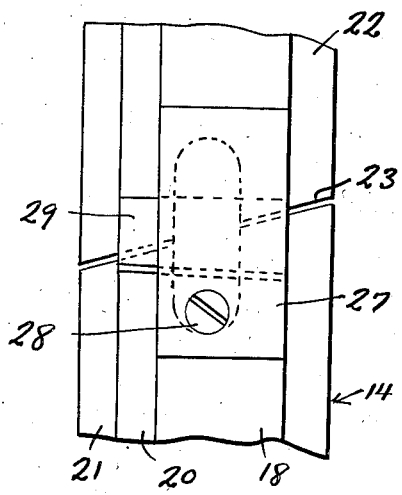
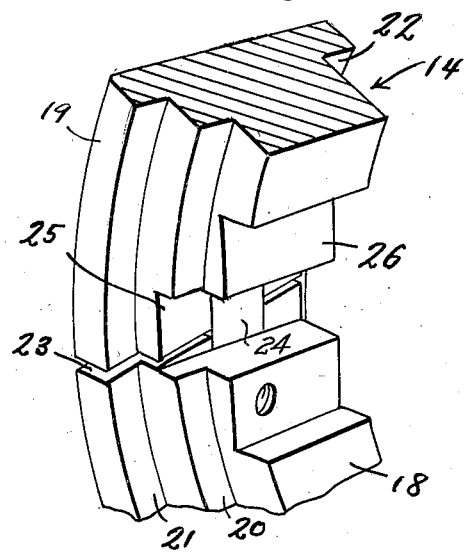
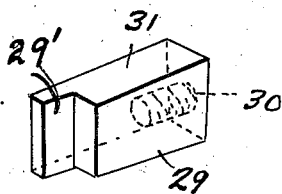
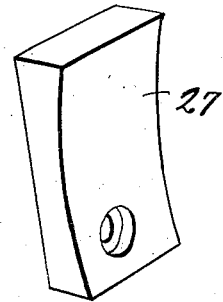
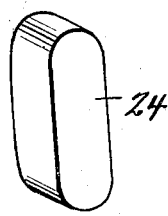
Inventor
Fitzhugh Lee White

Patented Feb. 28, 1939

2,149,154

UNITED STATES PATENT OFFICE 2,149,154

STEAM PISTON

Fitzhugh Lee White, South Norfolk, Va.

Application December 3, 1937, Serial No. 177,981

1 Claim. (Cl. 309—7)

The present invention relates to a structurally improved piston destined and aptly fitted for use in steam cylinders and the like and has reference in particular to the specific composite construction of the head, and the primary object is to so design and perfect the head as to provide a periodically and progressively adjustable ring susceptible of maintaining an effective steam tight contact between itself and the wall of the cylinder.

The essential feature of the invention, as will be hereinafter discerned, is the adoption and use of a transversely split radially expansible packing ring, there being a plug incorporated therein to bridge the gap between the ring-ends so as to permit repeated adjustments while at the same time preventing the passage of steam through the gap produced by said slit.

In reducing to practice the preferred embodiment of the idea I have found it expedient and practicable to utilize a sturdy ring characterized by a strong and durable stepped or grooved annulus, said annulus being provided with a keyway to accommodate a wedge style expanding key developed and arranged to insure effective expansion, said key being readily available for adjustment purposes.

Furthermore, I have structurally perfected a wedge or key expanded split ring associated with a properly supporting hub or core, the hub and ring being adapted to accommodate a readily removable follower type gasket forming plate.

Other features and advantages will become more readily apparent from the following description and drawings:

In the drawings, wherein like numerals are employed to designate like parts throughout the various views:

Figure 1 is what may be conveniently called a top plan view of the improved sectional or composite piston head.

Figure 2 is a side or edge elevational view bringing out to advantage the gap closing removable plug.

Figure 3 is a view like Figure 1 with the ring-like follower plate removed to expose the expander wedge and associated details.

Figure 4 is a section taken approximately on the plane of the line 4—4 of Figure 3.

Figure 5 is a fragmentary inside peripheral or edge view looking at the inner perimeter of the gap portion of the ring.

Figure 6 is an enlarged isometric or perspective view partly in section showing the key-way, slit and other details, the expanding wedge being omitted.

Figures 7, 8 and 9 are detail perspective views of the wedge, wedge retention clip and gap closing plug respectively.

Reference is had first to Figure 4 wherein it will be observed that the piston rod 10 is shouldered at its outer end to provide a reduced extension or stem 11 to accommodate the multipart or composite packing type head 12. As before indicated, this unit 12 is made up of three essential parts, that is, the hub or mounting 13, the ring 14 and washer type follower plate 15. It will be noted that the threaded end of the stem 16 extends through and beyond the central apertured portion of the plate 15 to accommodate a clamping and assembling nut 17. It will be further noted that the marginal or outer peripheral edge portion of the ring-like hub is of stepped formation to facilitate firm and steam tight fitting or seating of the ring 14 thereon. The diameter of the plate 15 is greater than the greatest diameter of the hub member 13.

Observing Figure 6 it will be observed that the packing ring includes a sturdy annulus 18 circumscribed by an annular rim 19. The annulus is grooved on its bottom as at 20 to provide a shoulder to rest on the coacting shouldered portion of the hub as seen in Figure 4. It is also spaced from the top and bottom edges of the rim to allow these edges to project as at the points 21 and 22. The projecting annular lip 22 coacts with the annulus in forming a seat for the aforementioned follower plate 15 (see Figure 4). The remaining projecting edge 21 surrounds the outer periphery of the innermost shoulder portion of the hub member 13. Thus this coaction of shoulders between the ring and the hub provide a substantially steam tight joint. It is obvious however, that any steam leaking through or between the edges is shut off by the plate 15 which bridges the contacting portions between the ring and hub also as shown in Figure 4.

As before indicated, the ring, as a unit, is obliquely split as at 23 and this allows for the radial expansion and contraction. Then too, on opposite sides of the slit are notches which may be called keeper notches 23' and these accommodate the end portions of the somewhat ovate gap closing plug 24. This part as brought out to advantage in Figures 2 and 3 is removably lodged in the notches and bridges the slit 23 to prevent the passage of steam through the piston head at this point. Also as brought out in Figure 6, there is a transverse notch 25 formed in the annulus and inward of this is a longitudinally extending notch 26 at right angles thereto. These two notches, 25 and 26 thus formed, may be conveniently machined. The inner notch 26 serves as a seat for an adapter or retention clip 27. This has its inner surface of proper curvature to match the continuing curvature of the inner perimeter of the annulus 18 whereby to provide effective seating on the hub member 13. The block-like clip 27 is held in place by a fastening screw 28 and in bridging the notch 25 converts the notch into an open ended key-way to accommodate the expanding key 29. One end of this is shouldered as seen at 29' in Figure 7 to match the shoulder on the annulus. The opposite end is formed with a screw threaded socket 30 to accommodate a suitable instrument (not shown) to facilitate insertion and removal of the key. In practice one longitudinal edge of the key is straight and the opposite edge is inclined or beveled as at 31 to provide the desired wedge-like expanding action. The assembly of parts 27 and 29 is brought out to advantage in Figure 3 of the drawings. In this figure the plate 15 has been removed to expose the said parts.

In disassembling it is obvious that the cover plate or washer 15 is removed to expose the expanding key 29. Then by inserting a screw eye or the like in the socket 30 the key can be lifted out. A proper size shim is then put in place and the key replaced and the cover plate or washer 15 is replaced. Prior to removing the key however, it is desirable to utilize feelers or similar measuring devices to determine the degree of expansion needed to take up any slack which has developed from excessive piston wear. Having determined the gauge necessary to compensate for this loss it is then advisable to fashion a shim to maintain the adjustment required. By removing the key and then inserting the shim and then replacing the key the requisite take-up action can be attained.

This ring, when installed in cylinder, should never be placed in any other position than the one in which it is installed. By leaving this ring in that position at all times, when expanding ring, ring and cylinder will always be a perfect fit at all times. Ring should be expanded as often as found necessary to prevent the ring from steam cutting. This will also keep ring and cylinder in a much better working condition and make the ring and cylinder last much longer. If possible to do so, hardness of the cylinder liner should be taken and a ring made out of casting suitable for same.

I have found with my experience that when you cannot get the hardness of the cylinder liner to find out what kind of a ring casting you should use, it is best to use a very hard casting.

I took an old discarded ring from a high pressure engine, which had been used one and one-half years previously and converted same into an expansion ring. The cylinder was .06½ out of true. I have had approximately two years service with this ring since I converted same into an expansion ring, which makes a total of three and one-half years service with same ring and from all indications this ring will last for the next fifteen years. In checking this ring I find that ring and cylinder are in perfect condition. This ring is being used in a tug-boat doing coast-wise towing and carrying one hundred and eighty pounds of steam.

This ring can be made at a very small cost, comparing the cost of this with other rings. In using a ring of this type you do not have to make new piston or follower plate. If this type of ring is not being used in an engine, you can take piston and re-machine same, then make ring to suit old piston. This saves the price of new piston and follower plate for all times as long as this type ring is used and will eliminate the boring of cylinder, as this ring and cylinder will both wear in perfect condition. This ring will eliminate the wearing of shoulders at counterbores as piston is machined down and ring made the length of piston over all. Therefore it eliminates any shoulders as long as cylinder has proper counterbores.

It is thought that the description taken in connection with the drawings will enable a clear understanding of the invention to be had. Therefore, a more lengthy description is though unnecessary.

While the preferred embodiment of the invention has been shown and described, it is to be understood that minor changes coming within the field of invention claimed may be resorted to if desired.

I claim:

In a device of the class described, a piston having a stepped periphery at one end portion thereof, a split ring encircling the piston and having stepped portions at one end portion thereof engaging the stepped portions of the piston, said ring at its other end having a flange which extends beyond the adjacent end of the piston, a plate fitting over the last-mentioned end of the piston and having its periphery engaging the inner wall of the flange, said ring at the split portion having an internal notch therein extending transversely and a wider notch located between the first notch and the internal wall of the ring, both notches opening out through the stepped edge of the ring and into the space occupied by the plate, a key fitting in the first notch and having a tool engaging socket in that end which is covered by the plate and a retaining plate fitting in the second notch for holding the key in place, said retaining plate and key being covered by the plate when the plate is in position, and a fastener for holding one end of the retaining plate to a part of the ring.

FITZHUGH LEE WHITE.